United States Patent
Casanova Cháfer et al.

(10) Patent No.: US 12,474,286 B2
(45) Date of Patent: Nov. 18, 2025

(54) GAS SENSOR

(71) Applicants: UNIVERSITAT ROVIRA I VIRGILI, Tarragona (ES); UNIVERSITAT POLITÈCNICA DE VALÈNCIA, Valencia (ES); CONSEJO SUPERIOR DE INVESTIGACIONES CIENTIFICAS, Madrid (ES)

(72) Inventors: Juan Casanova Cháfer, Tarragona (ES); Eduard Llobet Valero, Tarragona (ES); Rocío García Aboal, Valencia (ES); Pedro Atienzar Corvillo, Valencia (ES)

(73) Assignees: UNIVERSITAT ROVIRA I VIRGILI, Tarragona (ES); UNIVERSITAT POLITÈCNICA DE VALÈNCIA, Valencia (ES); CONSEJO SUPERIOR DE INVESTIGACIONES CIENTIFICAS, Madrid (ES)

( * ) Notice: Subject to any disclaimer, the term of this patent is extended or adjusted under 35 U.S.C. 154(b) by 326 days.

(21) Appl. No.: 18/014,238

(22) PCT Filed: Jul. 2, 2021

(86) PCT No.: PCT/ES2021/070484
§ 371 (c)(1),
(2) Date: Jan. 3, 2023

(87) PCT Pub. No.: WO2022/003229
PCT Pub. Date: Jan. 6, 2022

(65) Prior Publication Data
US 2023/0258589 A1    Aug. 17, 2023

(30) Foreign Application Priority Data
Jul. 3, 2020  (ES) .................. ES202030687

(51) Int. Cl.
*G01N 27/04* (2006.01)
*C01B 32/182* (2017.01)

(52) U.S. Cl.
CPC ........ *G01N 27/045* (2013.01); *C01B 32/182* (2017.08); *C01P 2002/34* (2013.01)

(58) Field of Classification Search
CPC .. G01N 27/045; C01B 32/182; C01P 2002/34
(Continued)

(56) References Cited

U.S. PATENT DOCUMENTS 9,366,664 B2 * 6/2016 Anglin, Jr. ........... G01N 33/497
                                                73/23.2
10,352,893 B2 * 7/2019 Nakagawa ......... G01N 27/4067
(Continued)

FOREIGN PATENT DOCUMENTS

JP         6523878 B2 * 3/2017 ........... G01N 27/409

OTHER PUBLICATIONS

Gas Sensing Properties of Perovskite Decorated Graphene at Room Temperature, Sensors 2019, 19(20), 4563; https://doi.org/10.3390/s19204563, 2019 (Year: 2019).*

(Continued)

*Primary Examiner* — Stephanie E Bloss
*Assistant Examiner* — Kevin C Butler
(74) *Attorney, Agent, or Firm* — Amster Rothstein & Ebenstein LLP

(57) ABSTRACT

The present invention refers to a gas sensor comprising a hybrid material of perovskite and graphene, to the method for obtaining said sensor and to the gas detection method using said sensor.

16 Claims, 9 Drawing Sheets

(58) Field of Classification Search
USPC .......................................................... 73/23.2
See application file for complete search history.

(56) References Cited

U.S. PATENT DOCUMENTS

| | | | | |
|---|---|---|---|---|
| 11,029,271 | B2* | 6/2021 | Lee | G01N 33/0054 |
| 2008/0128274 | A1* | 6/2008 | Raghurama | G01N 27/127 |
| | | | | 204/290.1 |
| 2009/0065369 | A1* | 3/2009 | Stevenson | C12Q 1/26 |
| | | | | 435/14 |
| 2017/0059511 | A1* | 3/2017 | Nakagawa | G01N 27/406 |
| | | | | 73/23.2 |
| 2018/0259472 | A1* | 9/2018 | Byun | C08K 3/16 |
| 2023/0184731 | A1* | 6/2023 | Fishman | G01N 21/658 |
| | | | | 356/301 |
| 2023/0258589 | A1* | 8/2023 | Casanova Cháfer | |
| | | | | C01B 32/194 |
| | | | | 73/23.2 |

OTHER PUBLICATIONS

Juan Casanova-ChÃ¡fer, VOCs Detection Employing Graphene Loaded with Perovskite Nanocrystals, Electrochemical Society Meeting Abstracts, vol. MA2020-01, IMCS 11: Chemical and Biosensing Materials and Sensing Interface Design. (Year: 2020).*
European Written Report 21 833 354.0, European Patent Office Form 1703 01.91 TRI, Aug. 23, 2024, 5 pages (Year: 2024).*
Supplementary European Search Report EP 21 83 3354, European Patent Office, Aug. 23, 2024, 1 of 3 pages (Year: 2024).*
Casanova-Chafer, J., et al., Gas Sensing Properties of Perovskite Decorated Graphene at Room Temperature, Sensors, Oct. 20, 2019, vol. 19, p. 4563; doi:10.3390/s19204563. Abstract; paragraph: "Introduction", "Perovskite Synthesis and Graphene Preparation", "Material Characterization" and "Gas sensing Measurements"; Fig. S3, "Supplementary Materials".
Casanova-Chafer, J., et al., VOCs Detection Employing Graphene Loaded with Perovskite Nanocrystals, ECS Meeting Abstracts, vol. MA2020-01, IMCS 11: Chemical and Biosensing Materials and Sensing Interface Design. Jan. 5, 2020, Recuperado de Internet: http://iopscience.iop.org/article/10.1149/MA2020-01352454mtgabs. Paragraphs: "Methods", "Results and Conclusions" and Fig. 1.
Surendran, A. et al., All Inorganic Mixed Halide Perovskite Nanocrystal-Graphene Hybrid Photodetector: From Ultrahigh Gain to Photostability, ACS Applied Materials and Interfaces, Jul. 31, 2019, vol. 11, pp. 27064-27072, ISSN 1944-8244 (print) ISSN 1944-8252 (electronic), <DOI: doi:10.1021/acsami.9b06416>. Abstract.
Xia, K., et al., CVD growth of perovskite/graphene films for high-performance flexible image sensor, Science Bulletin, Mar. 15, 2020, vol. 65, pp. 343-349, ISSN 2095-9273 (print) ISSN 2095-9281 (electronic), <DOI: doi: 10.1016/j.scib.2019.12.015>. Abstract.
Meng-Ya, Zhu, et al., Ppt-level benzene detection and gas sensing mechanism using (C4H9NH3)2PbI2Br2 organic-inorganic layered perovskite, Inorganic Chemistry Frontiers, Jan. 12, 2018, vol. 5, pp. 3046-3052, ISSN 2052-1553 (print), <DOI:doi: 10.1039/c8qi00803e>. Abstract.
International Search Report Issued to Application No. PCT/ES2021/070484 dated Jan. 6, 2022.
Written Opinion Issued to Application No. PCT/ES2021/070484 dated Jan. 6, 2022.

* cited by examiner

GAS SENSOR

CROSS-REFERENCE TO RELATED APPLICATIONS

This application is a U.S. national stage entry under 35 U.S.C. § 371 of PCT International Patent Application No. PCT/ES2021/070484, filed Jul. 2, 2021, which in turn claims priority to ES P202030687, filed Jul. 3, 2020, the contents of which are incorporated herein by reference in their entirety.

The present invention refers to a gas sensor comprising a hybrid material of perovskite and graphene, to the method for obtaining said sensor and to the gas detection method using said sensor.

BACKGROUND OF THE INVENTION

During the last decades, the growing air pollution has increased its harmful effects on the environment and human health. Therefore, to address these problems and help protect both the environment and the well-being of the population, it is required a ubiquitous and continuous monitoring of air pollutants. However, the development of a wide network of sensors to monitor air quality would only be possible if reliable, low cost and low power consumption detection devices were available. These new sensor networks would complement currently used instrumental techniques such as gas chromatography and mass spectroscopy, which, despite their precision and low detection limits, are bulky and expensive. Among the different technological alternatives, chemo-resistive sensors can be an appropriate option due to its easy manufacturing and use.

Most of the chemo-resistive gas sensors developed and marketed to date use metal oxides (MOx), since they present interesting properties such as adequate stability and high sensitivity. However, MOx have important limitations that compromise their implementation in autonomous gas detection networks. For example, their main drawback is the lack of selectivity, and in addition, they require high temperatures for their operation. Consequently, they require high energy consumption.

In recent years, graphene has aroused a great deal of research interest to develop a new generation of low-power gas sensors. Theoretically, graphene has the highest surface/volume ratio; in fact, a sheet of graphene has all its atoms exposed to the chemical environment. In addition, graphene presents a high carrier density and charge mobility, leading to a low noise level. Likewise, this chemo-resistive material has the ability to work at room temperature (low energy consumption).

However, its basic structure ($sp^2$ carbon configuration) is practically inert, offering low sensitivity and selectivity to gases. Therefore, the functionalization of graphene has been planned. For example, the US application with publication number US20160334386 describes a gas sensor comprising a layer of graphene in contact with a metalloporphyrin that has an affinity for nitric oxide.

Historically, the most studied modification has been the decoration of graphene with metallic or metallic oxide nanoparticles. This approach improves the sensitivity of the material and, to some extent, helps to fine-tune the selectivity. However, this strategy implies raising the operating temperature of the sensors above that of the environment so that the nanoparticles perform their functions of electronic and chemical sensitization. On the contrary, other alternatives, such as the treatment of graphene with plasma, promote the creation of defects and the anchoring of functional groups, which allows increasing the response capacity at room temperature. However, the selectivity is not improved.

In recent years, increasing research efforts have been focused on the development of gas sensors using perovskites. As an example, the sensor described in the patent with publication number U.S. Ser. No. 10/352,893 where a gas sensor based on perovskite is described. However, the main drawback of perovskites is their instability under humid conditions, which has prevented their commercial application up to now.

Therefore, it is necessary to develop new perovskite sensors that work at room temperature, under normal humidity conditions, that are sensitive and can detect different gases depending on the ions present in the perovskite.

DESCRIPTION OF THE INVENTION

A gas sensor has been developed that comprises a hybrid material graphene, perovskite. This material can be easily applied in chemo-resistive sensors that work at room temperature. In addition, their processing by means of solution methods entails a low cost and ease of synthesis, making them more attractive than other options. Furthermore, perovskites show very interesting properties from the gas detection point of view, such as adjustable bandwidth, high absorption coefficient and long carrier lifetimes. Modulation of the bandgap can be achieved by modifying the structure of the $ABX_3$ perovskite by substitution of its A, B and/or X components.

The gas sensor of the invention achieves a highly reproducible, reversible, sensitive and ultra-fast detection at room temperature. Additionally, the low noise levels in the response demonstrate that detection at trace levels (ppb) is possible. The creation of a library of perovskite nanomaterials by changing the cation and/or anion in the $ABX_3$ structure is possible, opening the possibility of adapting the devices to the detection of a wide spectrum of gases.

Graphene has proven to be very effective in protecting perovskites against the effect of environmental humidity and, therefore, in preventing their long-term degradation, thanks to the high hydrophobicity of graphene.

In the present invention, the perovskite nanocrystals are embedded in the graphene and this improves the sensitivity and performance of the sensor. In this way the electrical response of the sensor is generally improved without affecting the relative performance of the anions/cations of the perovskites.

Therefore, a first aspect of the invention refers to a gas sensor comprising: a hybrid material comprising metal halide perovskite nanocrystals of the formula $ABX_3$ and graphene deposited on a substrate with electrodes where the perovskite nanocrystals are embedded in the graphene.

In the present invention the term metal halide perovskite refers to an $ABX_3$ material, where A is an organic and/or inorganic cation, B is a metal and X is a halogen with a structure based on the mineral perovskite, $CaTiO_3$.

In the present invention the term nanocrystal means a crystal in which at least one of its dimensions is less than 100 nm.

It is important to note that the graphene preparation has an essential role in the performance of gas detection. In the preparation method, graphene is exfoliated in liquid phase (LPE). This is an attractive preparation method given its low cost.

A second aspect of the invention refers to a method of obtaining the sensor described in the first aspect of the invention. This is a method for obtaining a sensor comprising the following stages:
 a) preparing a graphene dispersion;
 b) exfoliating the graphene from the previous dispersion;
 c) adding and mixing some metal halide perovskite nanocrystals to the exfoliated graphene solution to obtain a hybrid material of graphene and perovskite;
 d) depositing the hybrid material of graphene and perovskite on a substrate containing electrodes.

The sensors of the invention can be connected to a gas detection system and therefore, the third aspect of the invention refers to a gas detection method comprising the steps of:
 a) placing the sensor defined in the first aspect of the invention in a chamber through which the gas flow passes,
 b) measuring the change in resistance after the passage of gas.

DESCRIPTION OF A PREFERRED EMBODIMENT

Figure 1A:
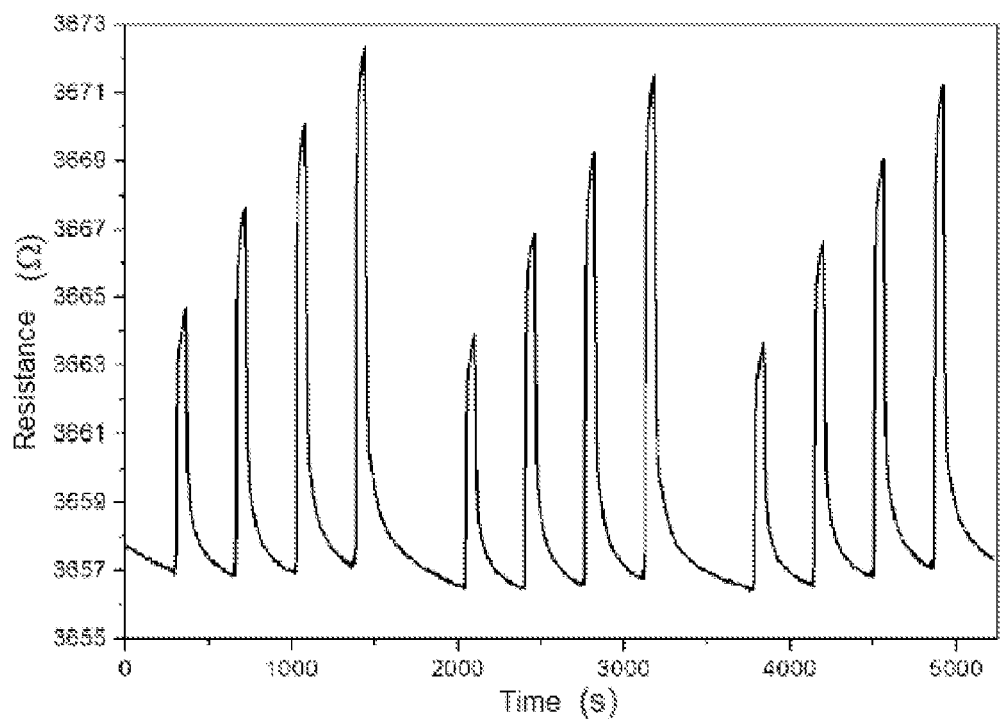
FIG. 1 AB shows the responses obtained for the detection of benzene (1A) and toluene (1B) using graphene decorated with different NCs of $MAPbBr_3$.
Figure 1B:
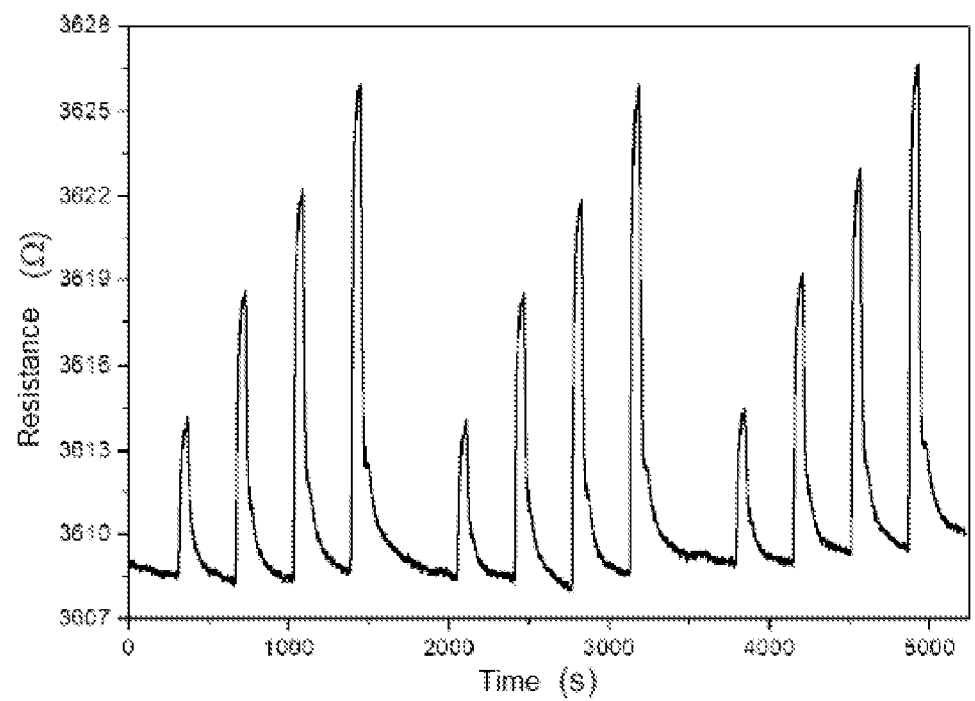
Figure 2A:
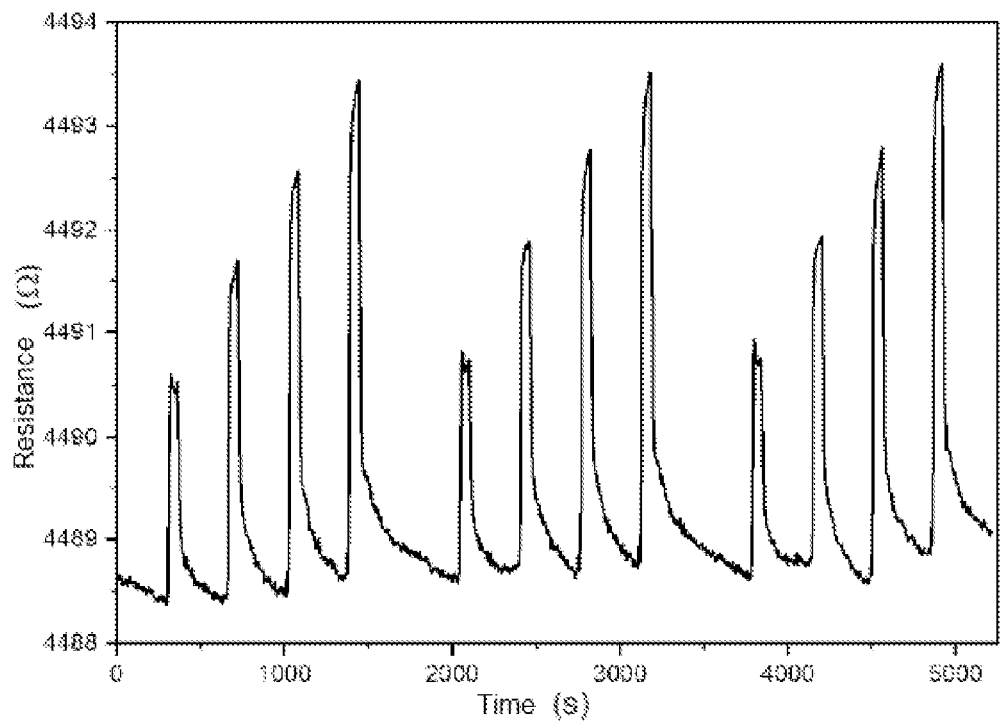
FIG. 2 AB shows the responses obtained for the detection of benzene (2A) and toluene (2B) using graphene decorated with different NCs of $CsPbBr_3$.
Figure 2B:
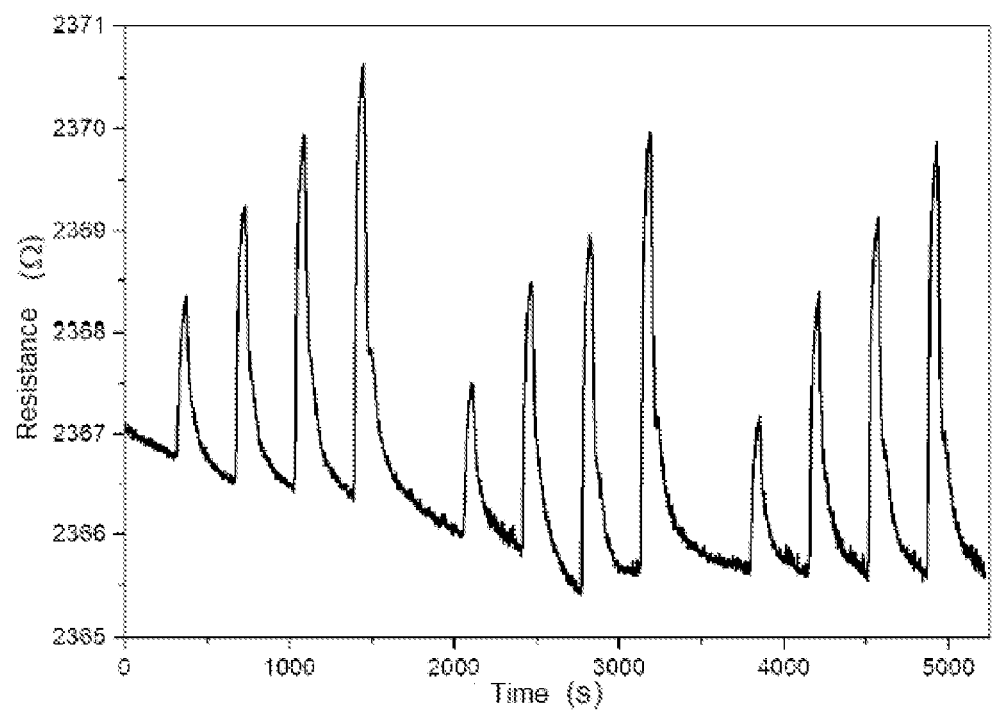
Figure 3A:
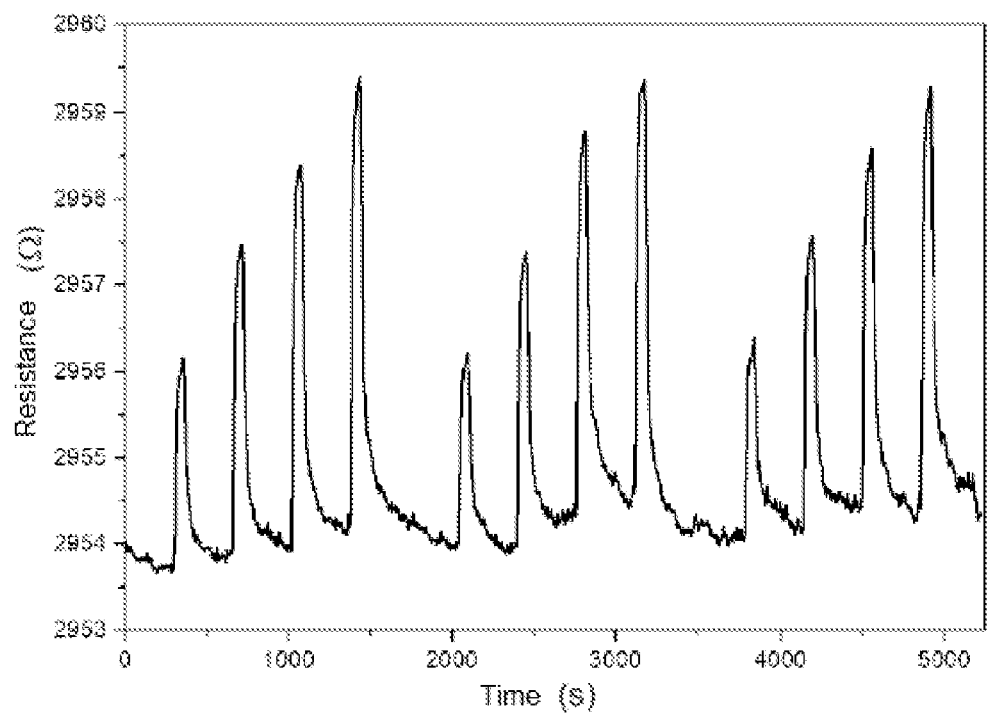
FIG. 3AB shows the responses obtained for the detection of benzene (3A) and toluene (3B) using graphene decorated with different NCs of $FAPbBr_3$.
Figure 3B:
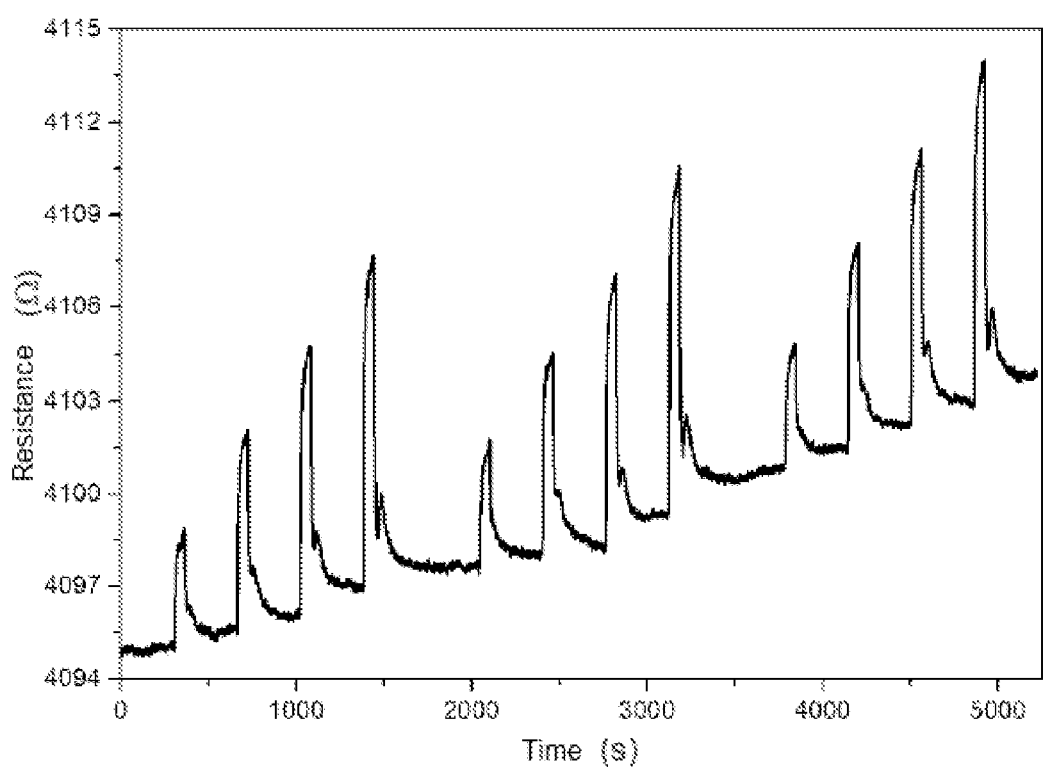
Figure 4A:
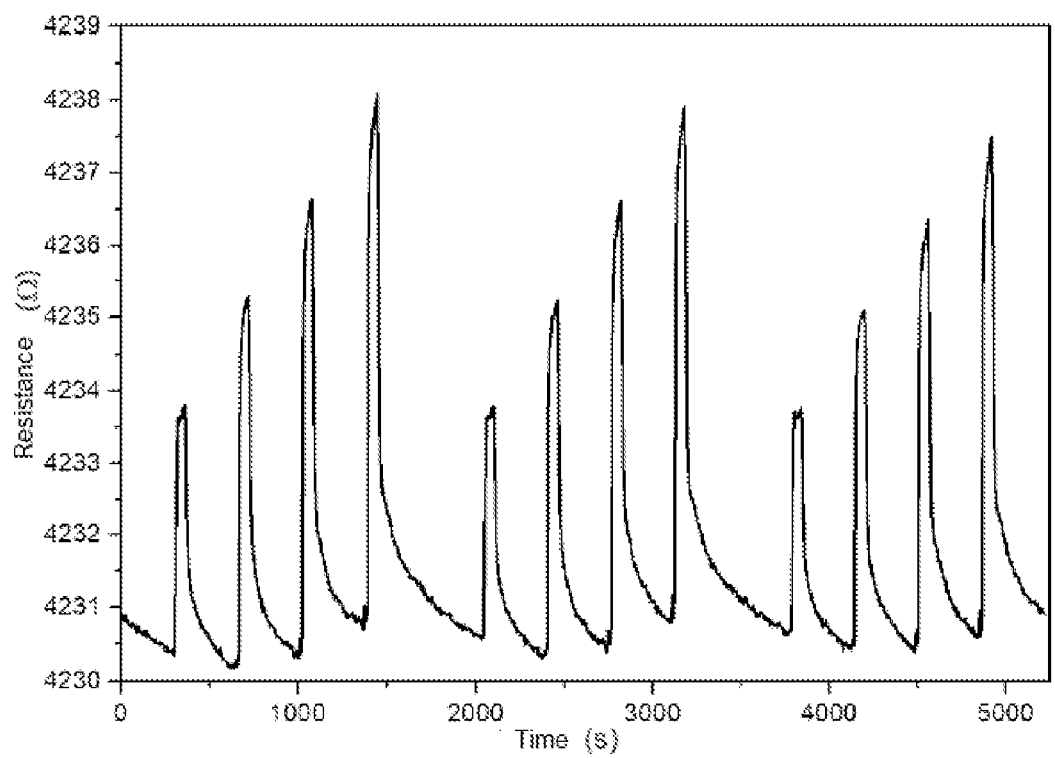
FIG. 4 AB shows the responses obtained for the detection of benzene (4A) and toluene (4B) using graphene decorated with different NCs of $MAPbCl_3$.
Figure 4B:
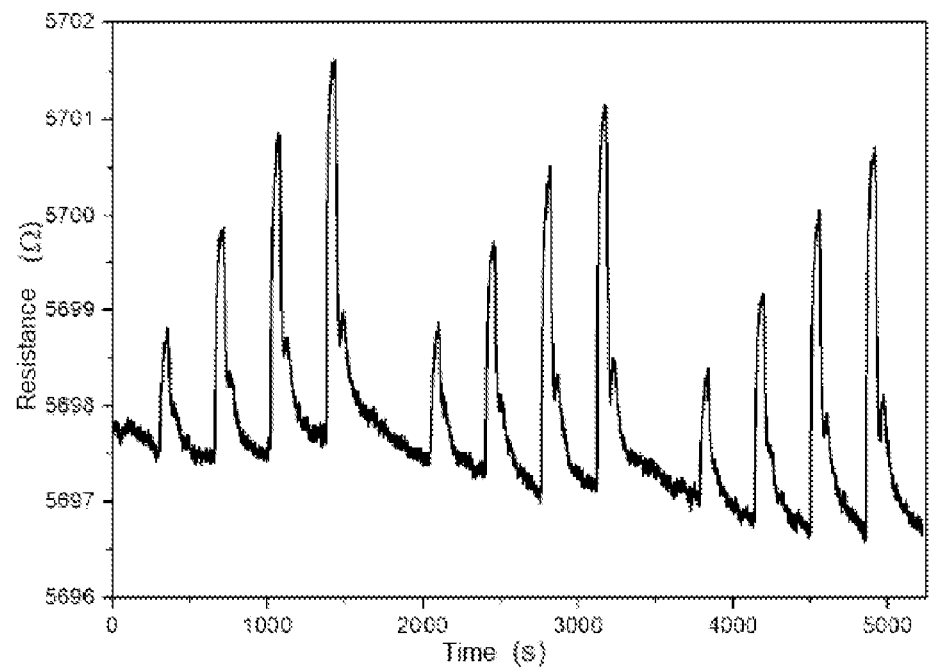
Figure 5A:
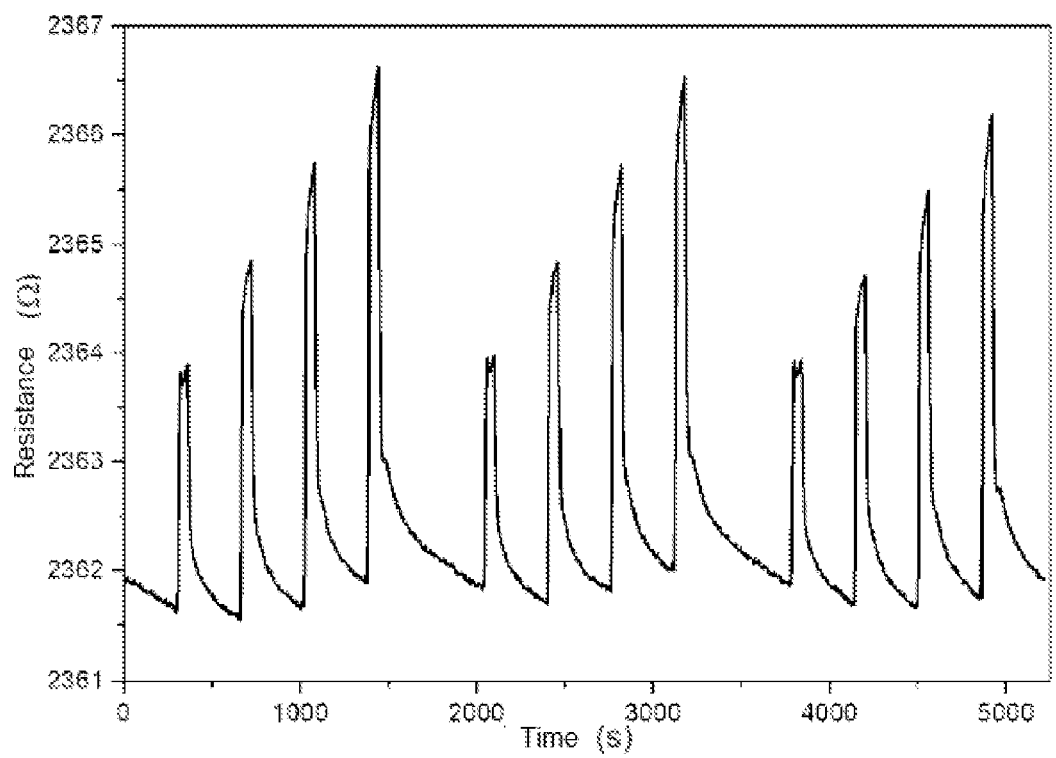
FIG. 5AB shows the responses obtained for the detection of benzene (5A) and toluene (5B) using graphene decorated with different NCs of $MAPbBr_{2.5}I_{0.5}$.
Figure 5B:
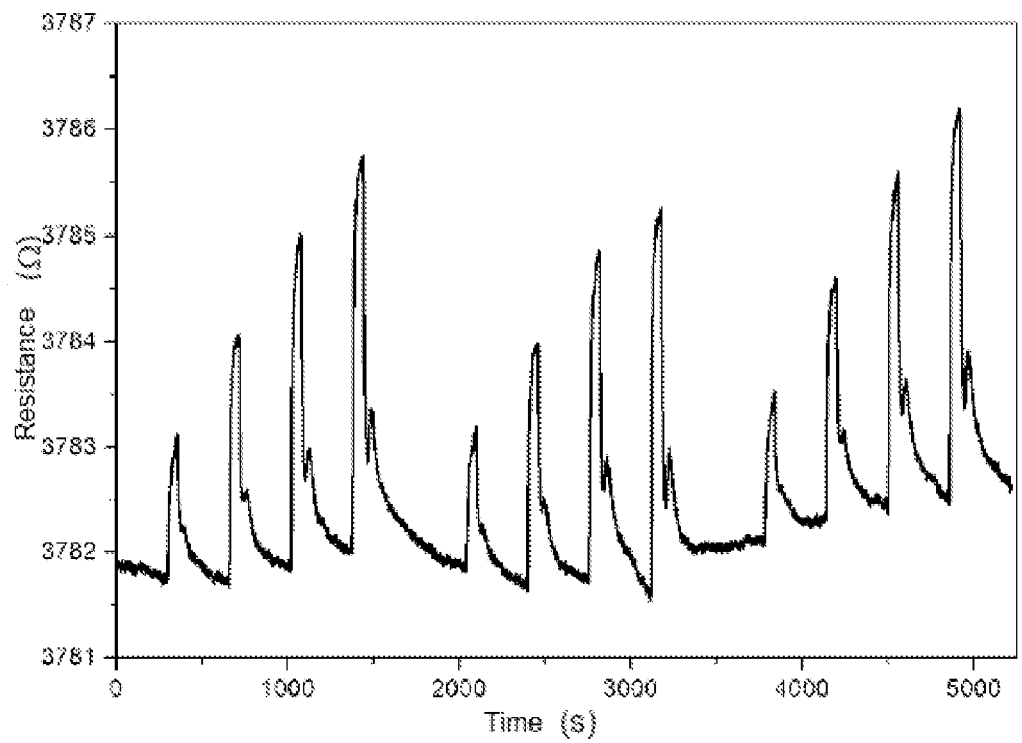

As stated above, the first aspect of the invention refers to a gas sensor comprising: a hybrid material comprising metal halide perovskite nanocrystals of formula $ABX_3$ and graphene deposited on a substrate with electrodes where the perovskite nanocrystals are embedded in the graphene.

Preferably the sensor has less than 10% oxygen functional groups. This feature gives it a better transport of carriers (hollows). This is due to shifting the Fermi level towards the valence band and increasing the work function. In addition, the limited oxygen content maintains the high hydrophobicity of graphene, thus continuing to confer high stability to gas sensors composed of perovskite and graphene nanocrystals.

Preferably in the $ABX_3$ configuration, B is selected from divalent metals, more preferably from: $Pb^{+2}$, $Sn^{+2}$, $Cu^{+2}$, $Mn^{+2}$, $Fe^{+2}$, $Ge^{+2}$, $Bi^{+2}$, $Sb^{+2}$ or a mixture thereof.

Preferably A in the formula $ABX_3$ is an organic and/or inorganic monovalent cation. More preferably, it is selected from: methylammonium, MA ($CH_3NH_3^+$), formamidinium, FA (($NH_2$)$_2CH^+$) and cesium ($Cs^+$), guanidinium, phenylethylammonium, $K^+$ and $Rb^+$ or combinations thereof.

Preferably $X_3$ represents the anion, selected from $Cl^-$, $Br^-$ and $I^-$.

Preferably perovskite nanocrystals are comprised between 6 to 8 nanometers in size.

Preferably the substrate is alumina.

The monitoring of benzene and toluene is of great interest due to its danger, for example, benzene is considered a carcinogen. For all these reasons, the detection of trace levels in the environment is highly relevant.

Preferably the gas to be detected in the sensor is benzene and toluene, and the cation of the perovskite is methylammonium.

Preferably the cation of the perovskite is methylammonium and the anion is bromine.

Preferably the gas to be detected is $NO_2$, and the cation of the perovskite is formamidine.

Preferably the gas to be detected is $NH_3$, the cation of the perovskite is methylammonium and the anion of the perovskite is a chlorine anion.

Preferably halogen of the perovskite is selected from an anion of chlorine and/or bromine and/or iodine.

As has been stated before, the second aspect of the invention refers to a method for obtaining a sensor defined above that comprises the following stages:
 a) preparing a graphene dispersion;
 b) exfoliating the graphene from the previous dispersion;
 c) adding and mixing the perovskite nanocrystals to the exfoliated graphene solution to obtain a hybrid material of graphene and perovskite;
 d) depositing the hybrid material of graphene and perovskite on a substrate containing electrodes.

Preferably the solvent of the solution of step a) is toluene or hexane and the graphene consists of sheets of graphene.

Preferably the graphene is exfoliated in step b) by pulsed sonication.

Preferably in stage d) the substrate is alumina containing screen-printed platinum interdigitated electrodes.

Preferably, the gas detection method described above as the third aspect of the invention is carried out at room temperature. Despite the fact that operation at room temperature usually implies a weak recovery of the sensor baseline, due to the low desorption rate of adsorbed molecules, room temperature is used for several reasons: low power consumption, to preserve the NC of perovskite from its degradation, thus improving the useful life of the sensor.

EXAMPLES

The following examples are only for illustrative purposes of this invention, and should not be construed as limiting the same.

In all the examples the methods to quantify the color transmittance in the prepared samples are as follows.

Example 1

Synthesis of Perovskite Nanocrystals (NC).

The synthesis of MA cation perovskite NC was adapted from the method proposed by L. Schmidt et al. First, a stock solution was prepared by adding 85 mg of oleic acid (OA) to 2 ml of 1-octadene (ODE). The solution was stirred and heated to 80° C. Subsequently, 33.5 mg of octylammonium bromide (OABr) was added.

Next, other specific solutions for each perovskite anion were prepared using different precursors. In the case of $MAPbBr_3$NCs, 26.4 mg and 18.3 mg of methylammonium bromide (MABr) and lead (II) bromide ($PbBr_2$), respectively, were dissolved in 200 μL of dimethylformamide (DMF). Meanwhile, 3.37 mg and 13.9 mg of methyl ammonium chloride (MACl) and lead (II) chloride ($PbCl_2$), respectively, were dissolved in 200 μL of dimethyl sulfoxide (DMSO) to form $MAPbCl_3$. Finally, to prepare the NCs of $MAPbBr_{2.5}I_{0.5}$, 2.7 mg, 3 mg, and 18.5 mg of methylammonium iodide (MAI), methylammonium bromide (MABr), and lead (II) bromide ($PbBr_2$) were added, respectively, to 300 μL of DMF. The solutions were shaken until completely dissolved.

Finally, each of the solutions with the specific precursors was added to the base solution. Subsequently, the solutions were cooled to 60° C. and 5 ml of acetone was added, causing the immediate precipitation of the different nanocrystals. Yellow, white and yellow-orange precipitates were obtained for $MAPbBr_3$, $MAPbCl_3$ and $MAPbBr_{2.5}I_{0.5}$ respectively. Subsequently, the solutions were centrifuged at 6000 rpm for 10 minutes to extract the precipitates, and finally they were dispersed in toluene.

$CsPbBr_3$: for the synthesis of this type of nanocrystals, the method proposed by L. Protesescu et al. To prepare the Cs oleate, $Cs_2CO_3$ (814 mg), ODE (40 mL) and OA (2.5 mL) were added to a 3-necked flask. Subsequently, the solution was mixed under stirring and heated at 120° C. for 1 hour. Finally, the temperature was increased to 150° C. under a nitrogen atmosphere to ensure the complete reaction of $Cs_2CO_3$ with oleic acid. The solution was cooled to room temperature obtaining a precipitate of Cs oleate.

Subsequently, another solution was prepared by mixing 69 mg of $PbBr_2$ and 5 ml of ODE in a 3-necked flask. The solution was then dried under vacuum at 120° C. for 1 hour. Next, 0.5 ml of dry oleylamine (OLA) and OA was injected while creating a nitrogen atmosphere. After complete solubilization, the temperature was raised to 140° C. and the Cs oleate solution (0.4 ml, prewarmed to 100° C. before injection) was rapidly injected. Five seconds later, the final solution was cooled using an ice water bath. Finally, 5 ml of tert-butyl alcohol (tBuOH) were added to favor the complete precipitation of the NCs. After the centrifugation step explained in the previous point, the $CsPbBr_3$ NCs were dispersed in hexane.

$FAPbBr_3$: NCs containing FA cation were carried out following the method proposed by L. Protesescu et al. First, the FA oleate precursor was prepared, where 521 mg of formamidinium acetate ($FA(CH_3COO)$) and 20 ml of OA were added to a 3-necked flask. Next, similar to the previous synthesis, the solution was heated at 120° C. for 1 hour. Subsequently, the temperature was increased to 130° C. until complete reaction. Finally, the FA oleate was dried for 30 minutes at 50° C. under vacuum and cooled to room temperature.

Subsequently, another solution was prepared by mixing ODE (5 ml) and $PbBr_2$ (69 mg) in a 3-necked flask. The solution was dried in vacuo for 1 hour at 120° C. Next, 0.5 ml of OLA and 1 ml of OA were injected at 120° C. under nitrogen flow. After complete solubilization of the $PbBr_2$ salt, the temperature was lowered to 100° C. Next, 2.5 mL of FA oleate solution was rapidly injected, and 5 seconds later, the reaction mixture was cooled using an ice-water bath. Finally, 10 ml of toluene and 5 ml of acetonitrile were added to favor the complete precipitation of the NCs. Finally, the solution was centrifuged and the FAPbBr3 NCs were dispersed in hexane.

TABLE 1

Synthesis summary

| Perovskite | Precursors | Reagents | Solvents | Solvent stabilizer |
|---|---|---|---|---|
| $MAPbBr_3$ | 26.4 mg MABr<br>18.3 mg $PbBr_2$ | 85 mg AO<br>2 mL ODE<br>33.5 mg OABr | 5 mL Acetone<br>200 μL DMF | Toluene |
| $MAPBCl_3$ | 3.37 mg MACl<br>13.9 mg $PbCl_2$ | 85 mg AO<br>2 mL ODE<br>33.5 mg OABr | 5 mL Acetone<br>200 μL DMSO | Toluene |
| $MAPbBr_{2.5}I_{0.5}$ | 2.7 mg MAI<br>3 mg MABr<br>18.5 mg $PbBr_2$ | 85 mg AO<br>2 mL ODE<br>33.5 mg OABr | 5 mL Acetone<br>300 μL DMF | Toluene |
| $CsPbBr_3$ | 814 mg $Cs_2CO_3$<br>69 mg $PbBr_2$ | 45 ml ODE<br>2.5 mL OA<br>0.5 mL OLA | 5 mL tBuOH | Hexane |
| $FAPbBr_3$ | 521 mg $FA(CH_3COO)$ | 21 mL OA<br>5 mL ODE<br>0.5 mL OLA | 10 mL Toluene<br>5 mL Acetonitrile | Hexane |

TABLE 2

Mean size of the crystals. Data extracted from HRTEM images

| Perovskite | Mean size (nm) | Interplanar distance (Å) |
|---|---|---|
| $MAPbBr_3$ | 7.2 ± 2.2 | 2.8 |
| $CsPbBr_3$ | 8.7 ± 1.1 | 5.8 |
| $FAPbBr_3$ | 6.9 ± 1.2 | 23 |
| $MAPbCl_3$ | 5.6 ± 1.5 | 2.6 |
| $MAPbBr_{2.5}I_{0.5}$ | 6.3 ± 0.6 | 3.0 |

Graphene Decoration with Perovskite NC and Configuration of Gas Measurements.

Once the different perovskite NCs were synthesized, a solution of graphene in toluene or hexane (0.5 mg/ml) was prepared using commercial graphene nanosheets from Strem Chemicals, Inc. (USA). Subsequently, the solution was placed in an ultrasonic tip to apply pulsed sonication (1 s on/2 s off) at 280 W for 90 minutes. Once the graphene is properly exfoliated, the perovskite NCs (5% by weight) were added to the solution. The nanomaterials were mixed in an ultrasonic bath for 1 hour. Finally, perovskite NC decorated graphene was deposited by a spray-coating technique onto alumina substrates containing screen-printed platinum interdigitated electrodes.

The developed sensors were placed in a Teflon chamber with a volume of 35 $cm^3$, which was connected to gas cylinders calibrated with synthetic air.

To study the detection of different gases, different dilutions were made in order to expose the sensors to variable concentrations. Sensors are stabilized under synthetic air for 5 minutes prior to application of the target gas concentration during 1 minute exposure. Total flow was set to 100 mL/min using a set of Bronkhorst High-Tech BV (Ruurlo, The Netherlands) flow controllers, while resistance changes were recorded using an Agilent HP 34972A multimeter connected to the measurement chamber. Responses are defined as ($\Delta R/R_0$) expressed as a percentage. Where $\Delta R$ is the resistance change during one minute of exposure to the gas, while $R_0$ corresponds to the reference resistance.

FIGS. 1 to 5 show the responses obtained for the detection of benzene (A) and toluene using graphene decorated with different perovskite NCs. For both gases, 2, 4, 6 and 8 ppm were applied in three consecutive cycles.

TABLE 3

Example of the average responses and relative error for the detection of benzene with graphene decorated with the different perovskite NCs.

| $C_6H_6$ (ppm) | $MAPbBr_3$ | $FAPbBr_3$ | $MAPbBr_{2.5}I_{0.5}$ | $MAPbCl_3$ | $CsPbBr_3$ |
|---|---|---|---|---|---|
| 2 | 0.202 ± 0.007 | 0.079 ± 0.004 | 0.096 ± 0.004 | 0.080 ± 0.005 | 0.0472 ± 0.0001 |
| 4 | 0.283 ± 0.008 | 0.117 ± 0.004 | 0.139 ± 0.006 | 0.119 ± 0.006 | 0.070 ± 0.001 |
| 6 | 0.345 ± 0.012 | 0.147 ± 0.006 | 0.172 ± 0.006 | 0.149 ± 0.004 | 0.0904 ± 0.0005 |
| 8 | 0.402 ± 0.014 | 0.167 ± 0.007 | 0.197 ± 0.007 | 0.169 ± 0.005 | 0.104 ± 0.001 |

The measurement methodology used in this work results in highly reproducible (less than 5% error), reversible (absence of significant baseline drift) and rapid (1 minute exposure) responses at room temperature.

Figure 6:
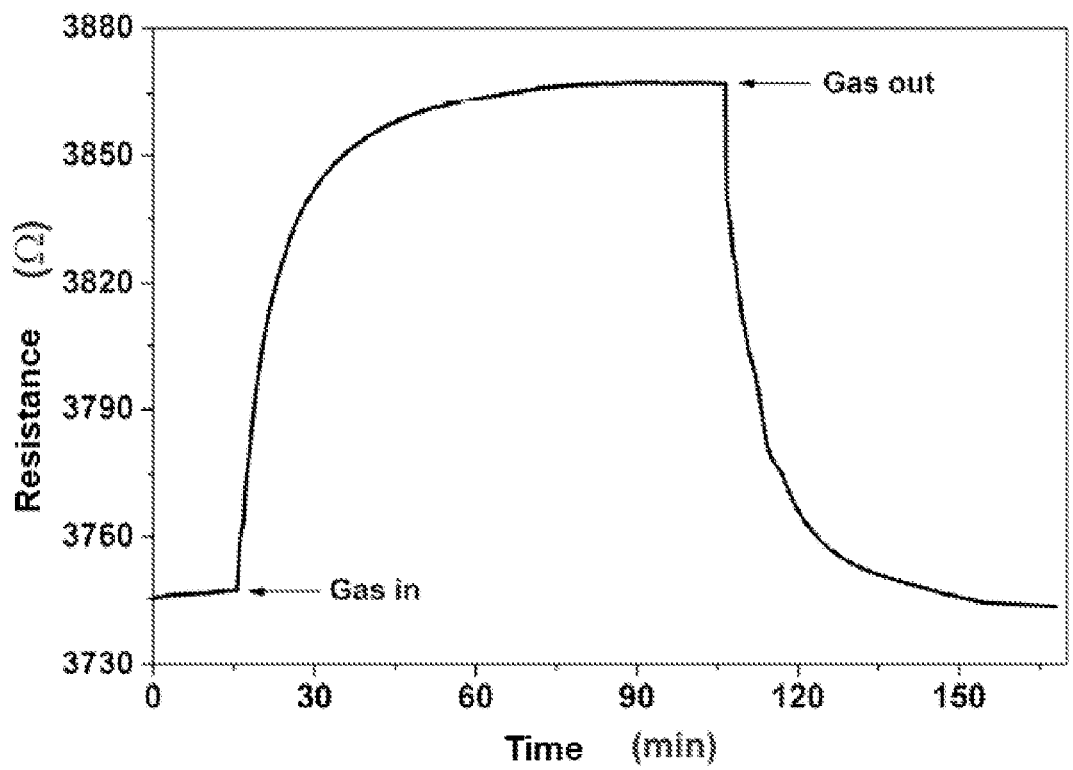
FIG. 6 is an example response and recovery curve for a lead halide perovskite decorated graphene sensor operating at room temperature.

Since the behavior of the sensor during the exposure to the gas until the stabilization of the response is important, FIG. 6 shows the saturation of the sensor and its initial recovery. Response and recovery times (t90) are approximately 30 minutes for a flow rate of 400 mL/min. Once the resistance baseline was stable in synthetic air, 10 ppm toluene was applied until saturation of the sensor response was reached. Basal recovery was achieved in fresh air.

Figure 7:
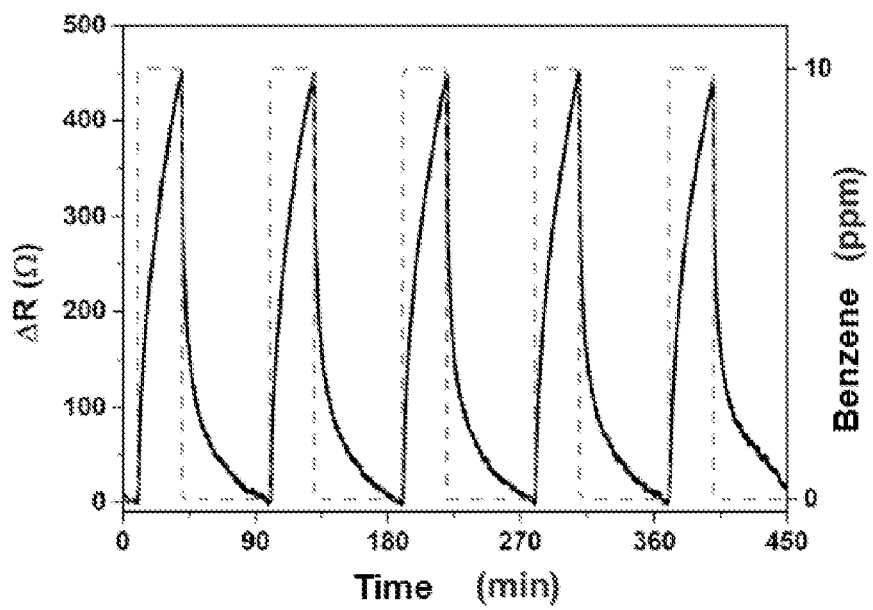
FIG. 7 shows a reproducibility analysis using the $MAPbBr_3$ perovskite.

FIG. 7 shows a reproducibility analysis using the $MAPbBr_3$ perovskite. Resistance changes (solid line) were recorded under exposure to 10 ppm benzene (dashed line) for long periods (30 minutes).

Figure 8:
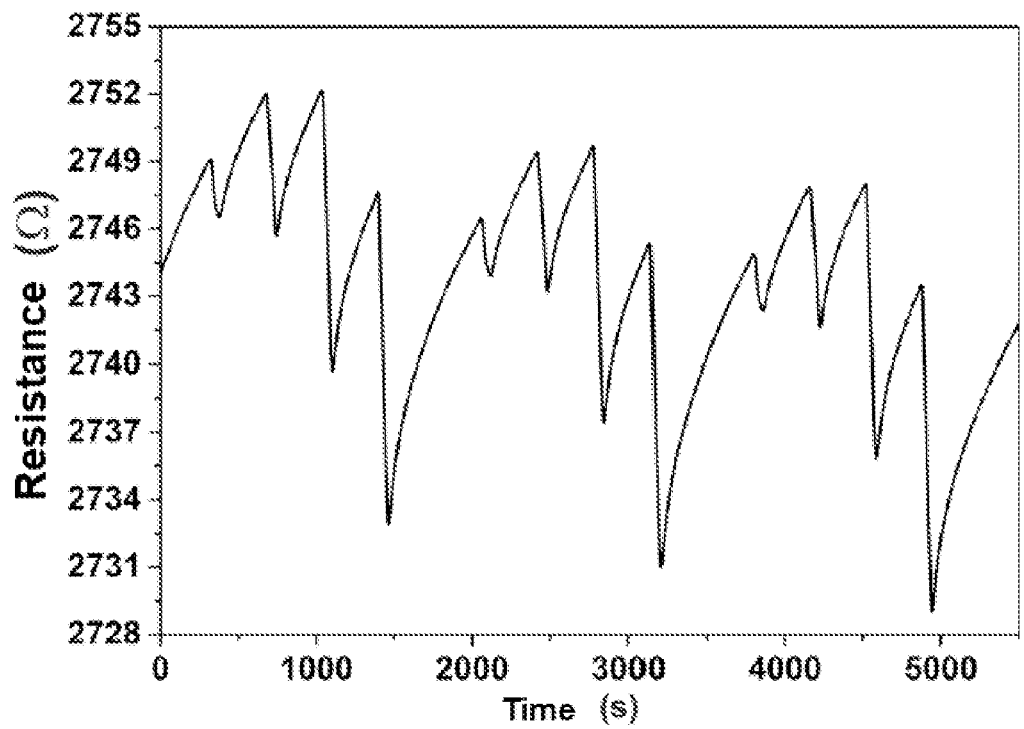
FIG. 8 shows an example of an electrical response to $NO_2$ using $FAPbBr_3$.
Figure 9:
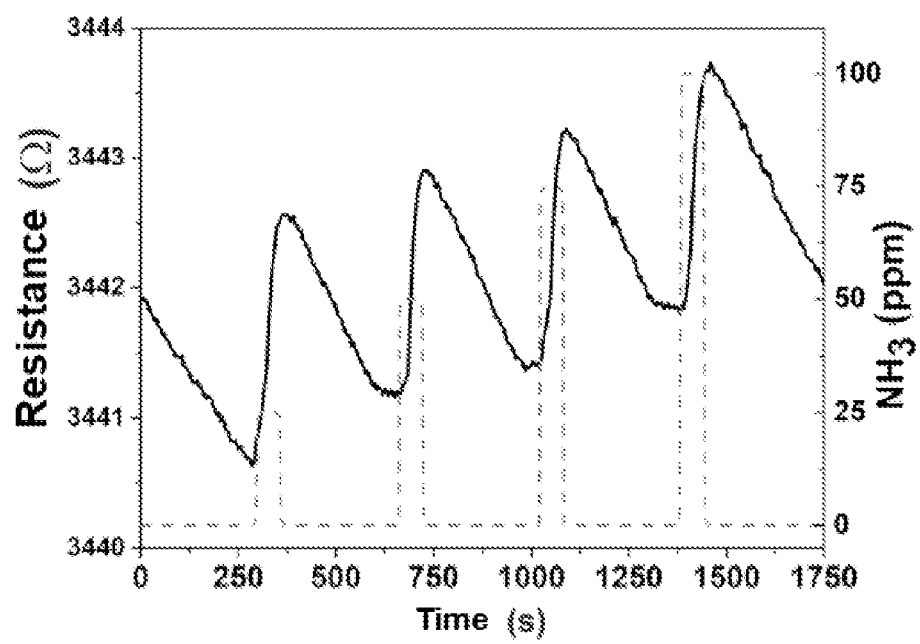
FIG. 9 shows exposure to different $NH_3$ concentrations by using $FAPbBr_3$ NC-decorated graphene.
Figure 10:
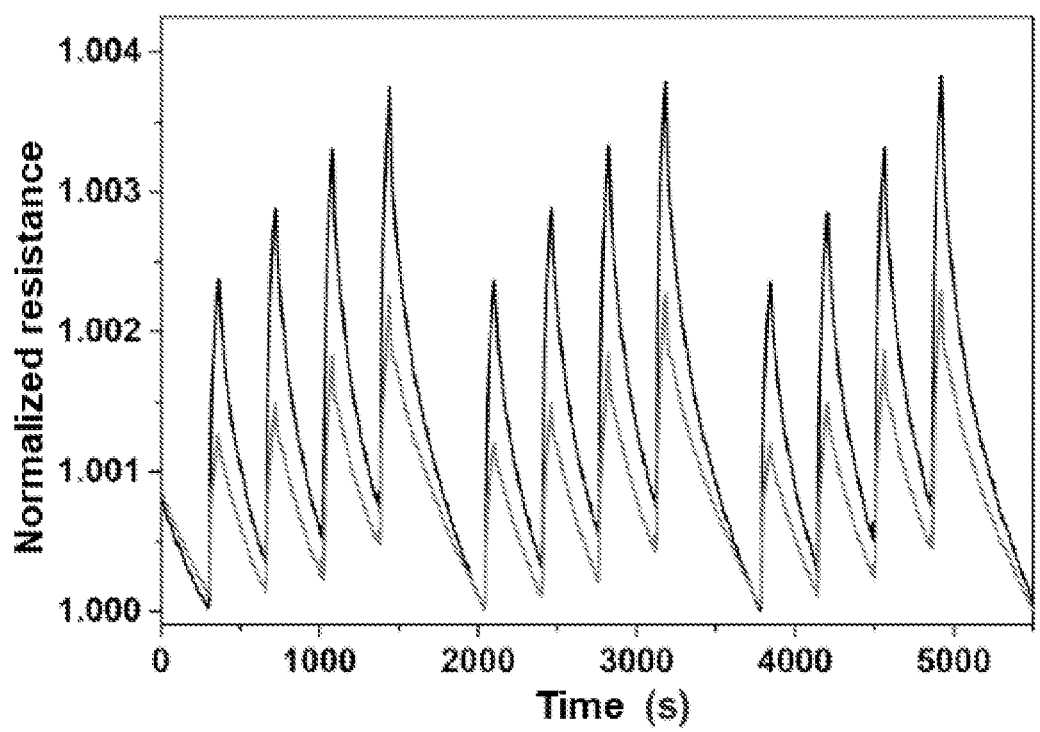
FIG. 10 shows a comparison of electrical responses to $NH_3$ using $MAPbCl_3$ (black line) and $MAPbBr_3$ (grey line) NCs.

FIG. 8 shows examples of electrical response to $NO_2$ using $FAPbBr_3$. Three consecutive cycles with four concentrations (250, 500, 750 and 1000 ppb) were applied for a 1 minute exposure. Synthetic air was used for a five minute wash between the different concentrations measured. FIG. 9 shows exposure to different $NH_3$ concentrations by using $FAPbBr_3$ NC decorated graphene. No sensitivity to ammonia was obtained because the resistance changes recorded are practically identical for the different analyte concentrations. FIG. 10 shows a comparison of electrical responses to $NH_3$ using $MAPbCl_3$ (black line) and $MAPbBr_3$ (red line) NCs. Three consecutive cycles with four concentrations (25, 50, 75 and 100 ppm) were applied for one minute. Again, there were applied five minute cleanings in synthetic air periods.

Figure 11:
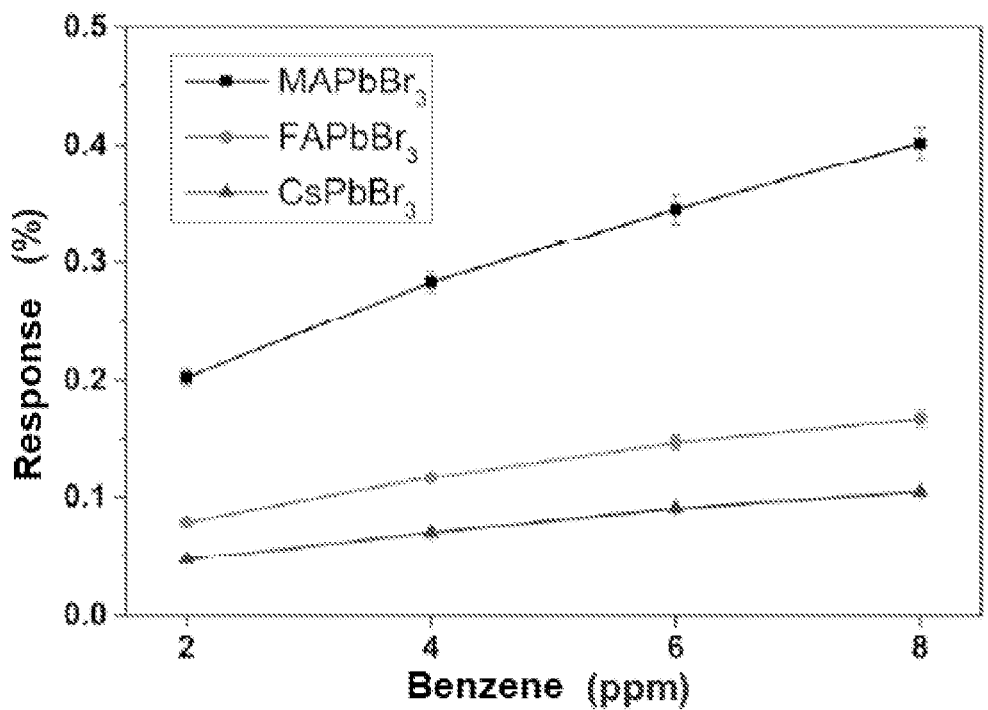
FIGS. 11A and 11B show calibration curves obtained for the detection of benzene using different cation (11A) and anion (11B) in lead halide perovskites.
Figure 11:
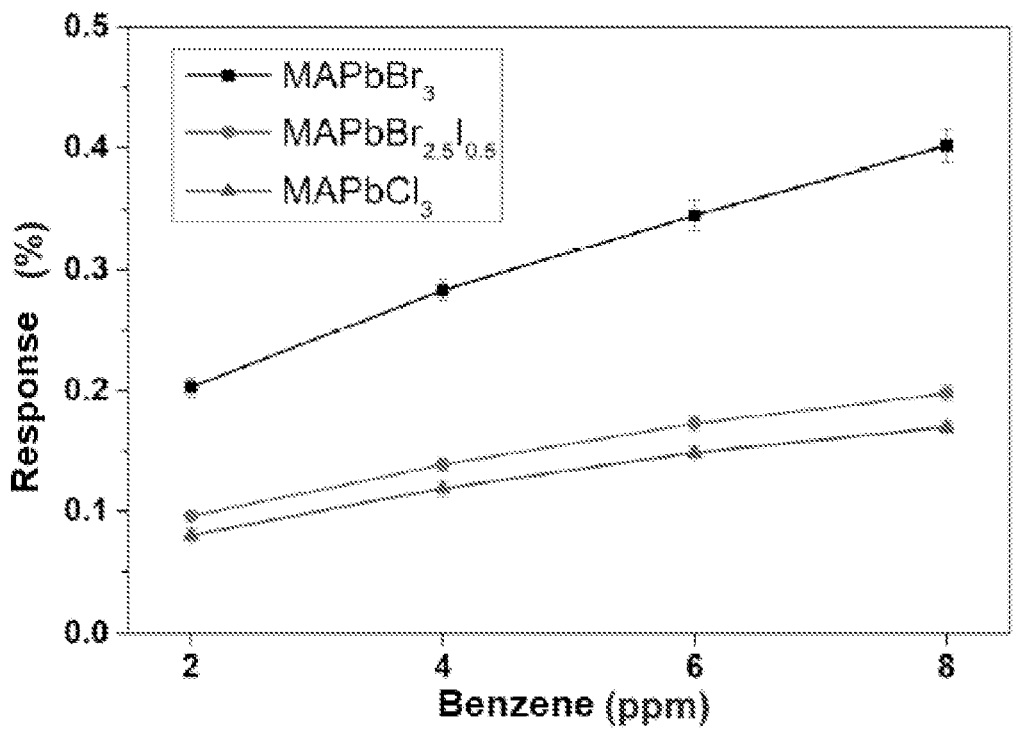

FIGS. 11A and 11B show the calibration curves for benzene detection using the different cations (a) and halide anions (b). Regarding the effect of the cation, MA shows a clear improvement in responses (up to 3 times greater) and in sensitivity (slope of the curve) compared to FA and Cs. Meanwhile, responses obtained by using different halide anions reveal that Br anions offer a higher response and sensitivity than Cl⁻ and I⁻ anions. Equivalent behavior was observed for toluene vapors. Aromatic molecules such as benzene and toluene can act as electron donating groups due to their delocalized electrons. A significant effect of Cs, MA or FA cations is clearly observed in graphene decorated with perovskite NC when exposed to these gases. In fact, higher electrical responses to both gases are recorded when MA is present in the perovskite structure. These better electrical properties are due to the positions of the energy levels (band structure) and the concentration of defects (traps).

The invention claimed is:

1. Gas sensor comprising:
   a hybrid material comprising formula $ABX_3$ metal halide perovskite nanocrystals, and graphene deposited on a substrate with electrodes where the perovskite nanocrystals are embedded in the graphene.

2. Gas sensor according to claim 1, where the graphene has less than 10% of oxygen functional groups.

3. Gas sensor according to claim 1, where A in the formula $ABX_3$ is a cation selected from: methylammonium, formamidinium and cesium.

4. Sensor according to claim 1, where the perovskite nanocrystals are comprised between 6 and 8 nanometers in size.

5. Sensor according to claim 1, the substrate of which is made of alumina.

6. Sensor according to claim 1, where A in the formula $ABX_3$ is methylammonium and X is bromine.

7. Sensor according to claim 1, where the gas to be detected is benzene and toluene, and A in the formula $ABX_3$ is methylammonium.

8. Sensor according to claim 1, where the gas to be detected is $NO_2$, and A in the formula $ABX_3$ is formamidinium.

9. Sensor according to claim 1 where the gas to be detected is $NH_3$, A in the formula $ABX_3$ of the perovskite is methylammonium and X is a chlorine anion.

10. Gas sensor according to claim 1, where the halide of the perovskite is selected from chlorine and/or bromine and/or iodine.

11. Method for obtaining a sensor defined according to claim 1 comprising the following steps:

a) preparing a graphene dispersion;
b) exfoliating the graphene from the previous dispersion;
c) adding and mixing the perovskite nanocrystals to the exfoliated graphene solution to obtain a hybrid material of graphene and perovskite;
d) depositing the hybrid material of graphene and perovskite on a substrate containing electrodes.

12. Method according to claim 11, where the solvent of the solution in step a) is toluene or hexane and the graphene consists of sheets of graphene.

13. Method according to claim 11, the graphene is exfoliated in step b) by pulsed sonication.

14. Method according to claim 11, where in step d) the substrate is alumina containing screen-printed platinum interdigitated electrodes.

15. Gas detection method comprising the stages of:
a) placing the sensor defined in claim 1 in a chamber through which the gas flow passes,
b) measuring the variation of the resistance after the passage of gas.

16. Method according to claim 15, characterized in that stage b) is carried out at room temperature.

* * * * *